Feb. 21, 1967     M. KEZRAN     3,304,597

FACING TOOL

Filed Aug. 5, 1964

INVENTOR.
MITCHELL KEZRAN

BY Maxwell J. Perrotta

ATTORNEY 3,304,597
FACING TOOL
Mitchell Kezran, 1157 Narragansett Blvd.,
Cranston, R.I. 02910
Filed Aug. 5, 1964, Ser. No. 387,651
4 Claims. (Cl. 29—105)

The present invention relates to improvements in tools and more particularly to an improved facing tool for pipes, tubes and the like.

An object of the present invention is to provide an improved facing tool for pipes, tubes and the like wherein the latter can be prepared for butting, welding, brazing and the like.

A further object of the present invention is to provide an improved facing tool for pipes, tubes and the like wherein at least two facing surfaces predeterminedly can be formed simultaneously.

Still another object of the present invention is to provide an improved facing tool wherein a pipe or the like can be formed with inside and outside chamfers as well as an end face simultaneously.

A still further object of the present invention is to provide an improved facing tool wherein pilot means is provided for guiding the relationship between the tool and the pipe to be faced.

Another object of the present invention is to provide an improved facing tool wherein the face and inside and outside chamfers can be simultaneously formed with throw-away cutting tools that can be rotated to provide several cutting edges.

A further object of the present invention is to provide an improved facing tool having pilot means for guiding the tool in relation to a pipe to be faced and wherein means is provided for correcting any out-of-round condition encountered in the pipe end.

Various other objects and advantages will become apparent from the detailed description to follow.

In the drawings:

FIGURE 1 is a perspective view showing the entire facing tool;

FIGURE 2 is a side elevational view thereof showing one form of pilot means and its cooperation with a pipe end;

FIGURE 3 is a front elevational view of the tool;

FIGURE 4 is a detail perspective view of a cutting tool and carrier, per se;

FIGURE 5 is a bottom plan view of the carrier of FIGURE 4;

FIGURE 6 is a side elevational view of a modified form of pilot means, per se;

FIGURE 7 is a front elevational view of the means of FIGURE 6.

FIGURE 8 is a detail sectional view of another embodiment of pilot means.

Referring more particularly to the drawings wherein like numerals apply to like parts throughout, it will be seen that I have provided an improved facing tool 10 which includes cutting tool carriers 12, 14, 16, see FIGURES 1–3.

The tool 10 includes a shank 18 by which the tool can be held for rotation about its longitudinal axis. The shank 18 terminates in an enlarged head 20 of generally Y-shape including legs 22, 24, 26. Each leg is formed with a T-shaped slot, as at 28, 30, 32, which is radially disposed relative to the longitudinal axis of the tool. The bottom surfaces of all three slots lie substantially in the same plane, as at 34, and the slots open out at the face 36 of the head. A radially disposed, threaded bore is formed in each leg coincidental with the bottom of each T-shaped slot 28, 30 and 32, as at 38, 40 and 42.

Each leg is cut away as at 43, 45, 47 to provide access to the tools 79 and the screws 66.

Also, each leg has a transversely extending threaded hole for lock screws, as at 44, 46 and 48. The head has an axial bore 50, for a pilot means hereinafter to be described, and a radial lock screw 52 is located in the shank 18, see FIGURE 2.

One of the cutting tool carriers 12 is shown in detail in FIGURES 4 and 5. The carrier 12 is in the form of a block having a pair of spaced pads 54, 56 located on the base at the ends thereof. The pads have aligned arcuate recesses 58, 60 for a tool such as a screwdriver or socket wrench. The block has an inclined surface 62 and a surface 64 is at right angles thereto. The block has a set screw 66 extending from the surface 64 for a purpose to be described.

One of the carriers 14 has a surface 68 which is at right angles to the base rather than inclined as in the above carrier 12.

A cutting tool 70 is provided for each carrier. Each tool 70 is square with four cutting surfaces and is secured by the set screw 66. The tool can be stepped around for use of the four cutting surfaces and then thrown away. The tool is held rigid by its engagement with the surface 62 or 68, as the case may be.

The carriers are slidably inserted respectively into the slots 28, 30, 32 but prior to insertion an adjustment stud 72 is placed between the pads 54, 56 of each carrier. Then, upon such insertion, the studs are threaded in, as by a screwdriver or socket wrench, so as to move the carriers radially inwardly. Of course, their radial positions are thereby adjusted. The positions are then secured by the set screws 44, 46, 48.

In this fashion the cutters 70 are placed in predetermined relation to the longitudinal axis and are so located and angularly oriented as to simultaneously cut inside and outside chamfers at the same time a facing surface is cut on a pipe P, as shown at 74, 76, 78 in FIGURE 2.

In order to properly engage the tool with the pipe end to be cut a pilot means is provided. FIGURE 2 shows one embodiment 80. The pilot means 80 includes a shank 82 engageable in the bore 50 and adapted to be held for rotation with the tool by the lock screw 52. The shank is cut-away at 84 so as to provide for inward adjustment of the carrier 12 which is the inside chamfering tool carrier.

The means 80 has an enlarged head 86 formed with several radial bores 88 receiving springs 90 and bearings 92. A retainer sleeve 94 is received over the bearings and is formed with openings 96 which align with the bearings to permit partial exposure thereof. The diameter of the pilot means is such as to be received within the pipe P to be cut, as shown.

Pipe, whereas in section it should be circular is frequently out-of-round. To compensate for this the above pilot means will function as though the pipe were perfectly circular.

Should the out-of-round condition be desired to be corrected rather than compensated, as above, the modified form of pilot means 98 is provided, see FIGURES 6, 7.

The pilot means 98 has a shank 100 similar to the one above described and similarly held in the tool head. The pilot means head 102 has a series of cut-away portions 104 for cutting tools 106 secured therein. The cutting tools are formed with angular cutting edges, the outside diameter of which is a substantially perfect circle. Upon engagement in a pipe end these tools cut a circular bore insofar as necessary.

Another modification is shown in FIGURE 8. The pilot means 108 includes a shank 110 which can be secured in the facing tool as in the above modifications. A pilot head 112 is rotatably received on the cam roll 114 which is held interiorly to the shank 110. The head 112 has O-rings at 116 for compensation of the eccentricity of the pipe interior. The head 112 will of course be held with the pipe whereas both of the above pilot means are held for rotation with the tool.

After a pipe end has been formed with inside and outside chamfers, as well as a face, it is ready for joining to a similarly prepared pipe by weld, etc. Better joints are thereby obtained.

In view of the foregoing, it is believed that I have provided an improved facing tool which fulfills the objects hereinbefore enumerated.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents are therefore intended to be embraced by these claims.

I claim:

1. A facing tool for pipes and tubes comprising a head adapted to be supported for rotation about its longitudinal axis, three radial channels formed in said head, a cutter holder mounted in each of said channels, means adjustably securing said cutter holders in predetermined radial positions, a cutter secured to each of said cutter holders, two of said cutters being secured so as to present cutting edges inclined to the longitudinal axis and a third of said cutters being secured so as to present a cutting edge in right angular relation to the longitudinal axis whereby chamfers can be formed simultaneously on the inside and outside diameters of a pipe at the same time a planar end face is formed on the pipe, and a pilot member guidingly receivable within a pipe end to be faced, said pilot member including a head having a plurality of bearings rotatably supported at its peripheral surface for rolling contact with the inside of a pipe.

2. A facing tool for pipes and tubes comprising a head adapted to be supported for rotation about its longitudinal axis, three radial channels formed in said head, a cutter holder mounted in each of said channels, means adjustably securing said cutter holders in predetermined radial positions, a cutter secured to each of said cutter holders, two of said cutters being secured so as to present cutting edges inclined to the longitudinal axis and a third of said cutters being secured so as to present a cutting edge in right angular relation to the longitudinal axis whereby chamfers can be formed simultaneously on the inside and outside diameters of a pipe at the same time a planar end face is formed on the pipe, and a pilot member guidingly receivable within a pipe end to be faced, said pilot member having an outside diameter substantially corresponding to the inside diameter of the pipe to be faced, said member having at least one cutter on the end thereof adapted to cut the inside of a pipe that is out of round.

3. A facing tool for pipes and tubes comprising a head adapted to be supported for rotation about its longitudinal axis, at least two radial channels formed in said head, a cutter holder mounted in each of said channels, means adjustably securing said cutter holders in predetermined radial positions, a cutter secured to each of said cutter holders, at least one of said cutters being secured so as to present at least one cutting edge inclined to the longitudinal axis, and one of said cutters being secured so as to present a cutting edge in right angular relation to the longitudinal axis whereby chamfers can be formed simultaneously on the inside and outside diameters of a pipe at the same time a planar end face is formed on the pipe, and a pilot member guidingly receivable within a pipe end to be faced, said pilot member including a head having a plurality of bearings rotatably supported at its peripheral surface for rolling contact with the inside of a pipe.

4. A facing tool for pipes and tubes comprising a head adapted to be supported for rotation about its longitudinal axis, at least two radial channels formed in said head, a cutter holder mounted in each of said channels, means adjustably securing said cutter holders in predetermined radial positions, a cutter secured to each of said cutter holders, at least one of said cutters being secured so as to present at least one cutting edge inclined to the longitudinal axis and one of said cutters being secured so as to present a cutting edge in right angular relation to the longitudinal axis whereby chamfers can be formed simultaneously on the inside and outside diameters of a pipe at the same time a planar end face is formed on the pipe, and a pilot member guidingly receivable within a pipe end to be faced, said pilot member having an outside diameter substantially corresponding to the inside diameter of the pipe to be faced, said member having at least one cutter on the end thereof adapted to cut the inside of a pipe that is out of round.

References Cited by the Examiner

UNITED STATES PATENTS

| | | | |
|---|---|---|---|
| 2,416,774 | 3/1947 | Rosenblatt | 29—105 |
| 2,559,950 | 7/1951 | Davis | 29—105 |
| 2,630,725 | 3/1953 | Black. | |
| 2,867,031 | 1/1959 | Briney | 20—105 |
| 3,033,062 | 5/1962 | Carlstedt | 77—72 |
| 3,122,818 | 3/1964 | Nance. | |

WILLIAM W. DYER, JR., *Primary Examiner.*

HARRISON L. HINSON, *Examiner.*